July 12, 1960 S. B. BOGESE ET AL 2,945,081
PROTECTIVE MOULDING FOR ELECTRICAL WIRE INSTALLATION
Filed Oct. 21, 1958 2 Sheets-Sheet 1
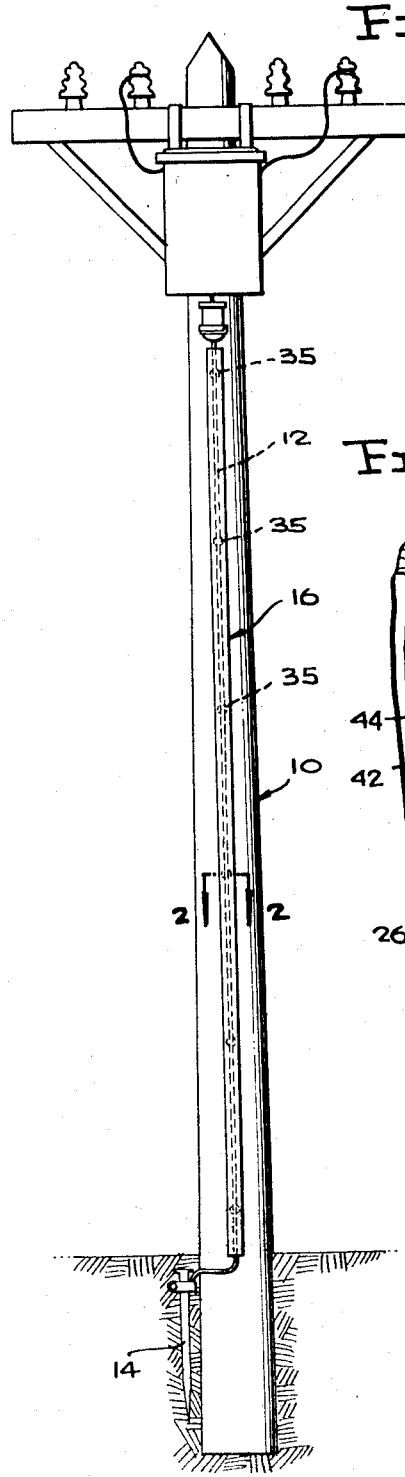
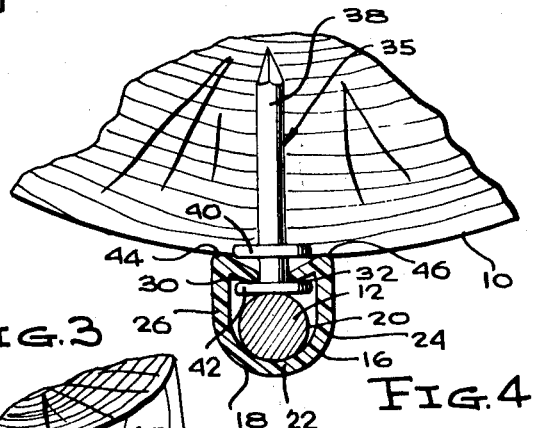
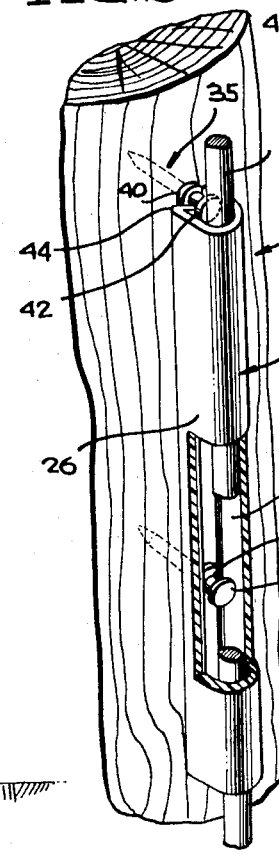
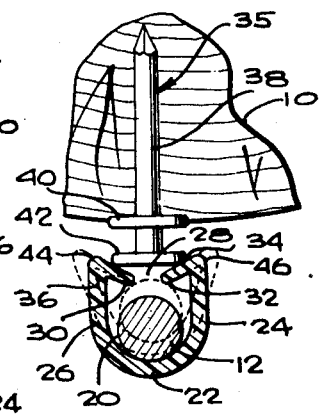
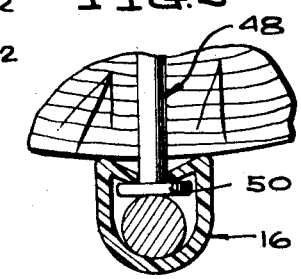
INVENTORS
STEPHEN B. BOGESE
CHARLES R. LEMON
BY & LAWRENCE F. STONER
ATTORNEYS July 12, 1960   S. B. BOGESE ET AL   2,945,081
PROTECTIVE MOULDING FOR ELECTRICAL WIRE INSTALLATION
Filed Oct. 21, 1958   2 Sheets-Sheet 2
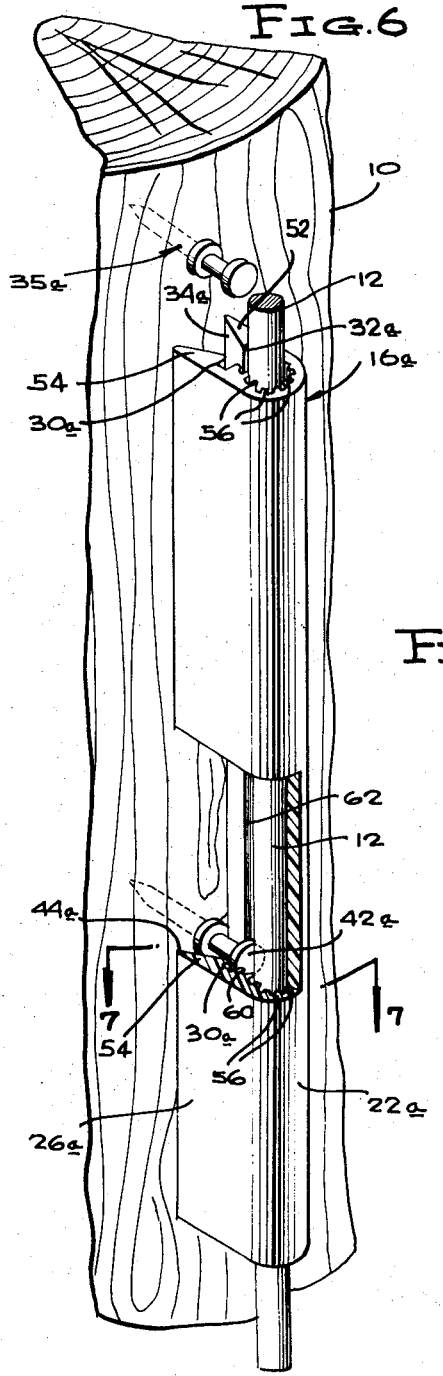
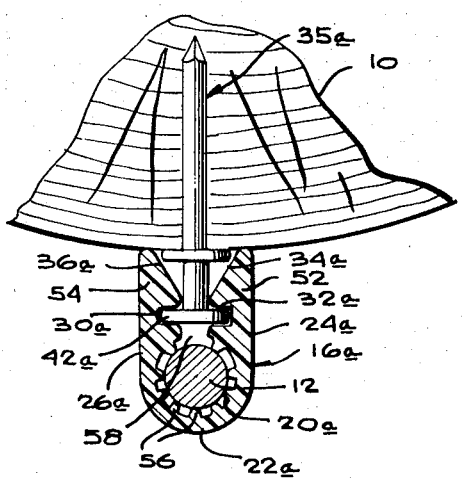
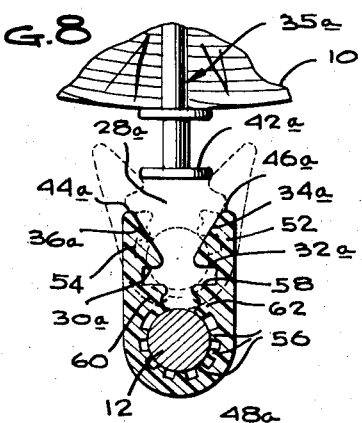
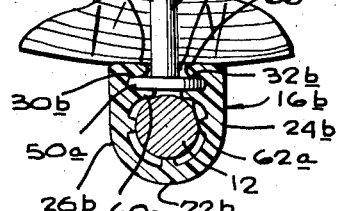
INVENTORS
STEPHEN B. BOGESE
CHARLES R. LEMON
BY & LAWRENCE F. STONER
McMorrow, Berman + Davidson
ATTORNEYS

United States Patent Office

2,945,081
Patented July 12, 1960

2,945,081

PROTECTIVE MOULDING FOR ELECTRICAL WIRE INSTALLATION

Stephen B. Bogese and Charles R. Lemon, Roanoke, and Lawrence F. Stoner, Salem, Va., assignors to Virginia Plastics Company, a corporation of Virginia Filed Oct. 21, 1958, Ser. No. 768,702

7 Claims. (Cl. 174—45)

The present invention generally appertains to improvements in mouldings.

More particularly, the present invention relates to an improved moulding for protectively and securely attaching an electric wire, cable or similar conductor to a support, primarily an outdoor support, and also relates to an improved electrical installation, such as a ground wire assembly which is secured on an outside support.

Thus, the present invention comprehends the provision of a mounting for securing an electric wire, cable or the like electrical conductor on a support and, in its preferred form and environment, comprehends the provision of a mounting means for attaching a ground wire to an outdoor support. But while the invention will be described in such form and environment, it is to be understood that such is merely by way of example only.

In conventional power or line pole installations, such as used in electrical transmission systems by power utilities and telephone companies, an insulated or bare ground wire extends from the top of the pole to a ground rod that is anchored in the ground.

It is conventional practice to secure the ground wire to the pole by positioning a half round wood moulding over the wire and securing such moulding to the pole by fastening means that encircles the moulding and is driven into the pole. Usually, U-shaped staples are used, with the bight portions of the staples overlying the exterior of the moulding and the prongs being embedded in the pole. Occasionally, clamps, such as conventional pipe straps, are used with the clamps overlying the exterior of the moulding and having their ends in contact with the pole and fastened thereto by nails.

Such conventional mounting means have not proven satisfactory in installation or in use.

In installation, considerable time must be expended and a certain skill is required, since the moulding must be temporarily held over the wire in engagement with the pole, with the wire properly and completely encased by the moulding, and then the staples or similar fasteners must be inserted over the moulding and driven into the pole.

There is no practical way to prevent overdriving of the staples and it is such overdriving that is a principal reason for the unsatisfactory performance of the moulding in use. The overdriving of the staples creates a binding pressure on the portions of the moulding underlying the staples and prevents the normal thermal expansion and contraction of the moulding with changes in the temperature. Therefore, the portions of the moulding between the staples becomes distorted or warped, due to the pressures of the staples on the moulding. This causes a separation between the pole and the moulding and leaves portions of the ground wire exposed and unprotected. In addition, pole shrinkage produces separations between the moulding and the pole or between the moulding and the staples.

In such cases, the exposed and unprotected ground wire produces interference in the electrical transmission systems and creates a dangerous hazard to linemen working on the pole or to others who may come in contact therewith. Not only is the exposed wire a source of potential danger to linemen but also the moulding, due to its distortion, becomes a physical hazard by projecting away from the pole since a lineman could easily become entangled with such projection.

Furthermore, such conventional moulding cannot withstand mechanical forces and tend to fracture or pull away under impacts from cleats, used by linemen, or other sources.

It has been suggested to use a plastic or rubber moulding, instead of a wood moulding, but in each instance, it is proposed to still use staples or a similar type of external fastener and, therefore, all of the defects and shortcomings of the wood moulding are not obviated.

A purpose of the present invention is to provide a moulding and mounting means therefor, which overcomes the defects of known and conventional assemblies.

Thus, a primary object of the present invention is to provide a moulding and mounting construction which will facilitate the mounting of ground wires and similar conductors, which will be resistant to any distortion by being capable of thermally expanding and contracting, which will maintain its preset relation with the wire and the support over a long period of time and which will provide long lasting and safe protection for the wire by being resistant to mechanical impacts and shocks.

An important object of the present invention is to provide a moulding which is formed and constructed for attachment to an anchoring means that has been initially driven into the pole or support so that the moulding, with the wire housed therein, is secured to a preset anchoring means, thereby obviating the use of external fasteners.

Another important object of the present invention is to provide a moulding having internally arranged means that is lockingly engageable with an anchoring means, which is initially attached to the pole or similar support.

A further important object of the present invention is to provide an anchoring means that is driven into the pole or support and over which a moulding, having the wire housed therein, is fitted with the moulding having locking means formed internally thereof to grip the anchoring means.

A still further important object of the present invention is to provide a moulding which can be snapped over the ground wire and a preset anchoring means and which has locking means that grips the anchoring means to hold the moulding in contact with the pole or support.

Generally stated, the present invention comprehends the provision of an anchoring means that is attached to the pole or support in spaced relation thereto and a moulding having an axial bore in which the wire is housed and having means extending along its long axis and opening laterally of one side thereof to fit over and grip the anchoring means.

More particularly stated, the present invention comprises headed fasteners, such as nails, which are driven into the pole or similar support with their heads spaced from the surface of the pole or support. Such fasteners are initially driven into the pole or support along the line of extension to be followed by the ground wire. The ground wire overlies the heads and is free from any secured engagement with the heads. The moulding, which is generally of a channel or U-shaped cross-section, is laterally passed over the wire and is inherently resilient so that its leg portions spread apart to pass over the heads. Cam means may be provided on the leg portions to assist in the snapping of the moulding over the heads. Locking means is provided on the inner surfaces of the legs and such locking means engages or grips behind the heads to lock the molding on the pole or support.

Among the many advantages of the moulding and attaching or mounting arrangement therefor are the following:

(1) Constant and complete protective covering of the ground wire since the moulding, because of its construction and manner of attachment, always hugs the surface of the pole and encases the wire;

(2) More effective and facile mounting of the ground wire due to the lateral passage of the molding over the ground wire and the anchoring means or fasteners, in the manner of a snapping action;

(3) Economy and speed of installation since the pre-driven fasteners are easier to drive and require little skill;

(4) Economy in manufacture and use because the moulding may be molded or extruded from a suitable plastic with the locking means formed integral therewith, thus realizing a one-piece, unitary moulding.

(5) Greater safety by the elimination of distortion, thus preventing exposure of the ground wire and outward buckling of the moulding, and also by the provision of a streamline external surface on the moulding.

The foregoing and ancillary objects and further structural features of merit are attained by this invention, the preferred embodiments of which are set forth in the following description and illustrated in the accompanying drawings, wherein;

Figure 1 is an elevational view of a power pole with the ground wire thereof being protectively secured to the pole by one form of moulding and mounting arrangement of the present invention;

Figure 2 is an enlarged cross-sectional view taken on line 2—2 of Figure 1;

Figure 3 is a fragmentary perspective view of the pole and attached moulding, with a portion of the moulding being broken away and shown in section;

Figure 4 is a view, similar to Figure 2, and shows the moulding prior to its attachment to the headed fastener or anchoring means;

Figure 5 is a cross-sectional view showing a modified mounting arrangement for the moulding of Figure 1;

Figure 6 is a fragmentary perspective view of the pole and illustrates a modified form of moulding in attachment thereto for mounting the ground wire thereon;

Figure 7 is an enlarged cross-sectional view taken on line 7—7 of Figure 6;

Figure 8 is a view, similar to Figure 7, and shows the moulding of Figures 6 and 7 prior to its attachment to the fasteners or anchoring means; and, Figure 9 is an enlarged cross-sectional view showing a modified form of moulding.

Referring now more particularly to the accompanying drawings, and initially to Figure 1, the line pole 10 is provided adjacent its upper end with conventional equipment, attendant with an electrical transmission system, and has a conventional ground wire 12. The ground wire extends down along one side of the pole from the top to a steel or copper ground rod 14 which is anchored in the ground.

The moulding 16 of the present invention, as illustrated in Figures 1–4, is designed and constructed to protectively mount the ground wire on the side of the pole, as shown in Figure 1.

The moulding may be fabricated from any suitable material by a moulding or extrusion process and may be formed in various lengths of straight or curved sections or in rolled lengths. Principally, it is desired that the moulding be formed of a material having an inherent flexibiliay so that it can be snapped in place over the wire and suitable pre-driven fasteners or anchoring means. Further, the material should possess good dielectric properties for safety purposes and should be of sufficient hardness to withstand mechanical blows or impacts and should have good outdoor weathering properties to withstand the elements and have a considerable use expectancy while retaining its original properties. It has been found that high density polyethylene, rigid and semi-rigid vinyls and other similar materials are well suited for use. However, practically any material, having the desired electrical and physical properties, can be used.

The moulding 16 is substantially channel-shaped or U-shaped in cross-section so that it presents a curved, unobstructed and streamlined outer substantially cylindrical surface 18. The moulding has an internal, axially extending bore 20 within which the ground wire is housed, the bore 20 being defined by the bight portion 22 and the opposing leg portions 24 and 26 which are in spaced, confronting relation. The outer ends of the leg portions are spaced apart to form a slot 28 in the moulding, such side slot extending along one side of the moulding and being in communication with the bore.

Intermediate the slot and the bore, an internal locking means is provided and, in the form of Figures 1–4, includes a pair of opposed locking shoulders 30 and 32. The locking shoulders 30 and 32 are arranged laterally of the leg portions so as to be disposed at right angles to the path of movement of the moulding over the fasteners, as will be described, and they are arranged in alignment. For facilitating the passage of the moulding over the fasteners, cam means 34 and 36 are provided outwardly of each shoulder, the cam means being provided on the inner surfaces of the outer end portions of the leg portions.

The cam means 34 and 36 are formed by reverting the outer ends of the leg portions so that they are bent inwardly and rearwardly at an acute angle to the inner surfaces of the leg portions and form rearwardly and inwardly turned extensions or wings, with the outer surfaces thereof serving as the cam means and the free ends thereof serving as the locking shoulders.

As afore described, fasteners or anchoring means are provided and may comprise double-headed nails 35. The shanks 38 of the nails are driven into the pole until the inner head 40 arrests the driving action, whereby the outer head 42 is spaced the desired distance from the surface of the pole. By utilizing double-headed nails as the anchoring means, no degree of skill is required in securing the anchoring means to the pole since the nails are driven until the inner head strikes the pole and arrests the driving action. At such point, the outer head will be properly spaced from the pole.

In use, the nails 35 are driven into the side of the pole in spaced alignment from adjacent the top to the bottom of the pole, as shown in Figure 1, the alignment of the nails being along the line of extension of the ground wire 12. The moulding, in any suitable sections, is then passed over the ground wire which overlies the outer heads 42 of the nails, the wire passing between the leg portions or through the slot 28 into the bore 20 so that it is housed within the moulding. A continuation of the same lateral movement of the moulding brings the cam means or surfaces 34 and 36 into engagement with opposing sides of the outer heads 42 of the nails, whereupon, under further pressure exerted on the moulding, the leg portions are spread apart to increase the width of the slot, as shown in dotted lines in Figure 4. The nail heads 42, when they pass beyond the locking shoulders 30 and 32, are free from the cam means and the leg portions then return to their normal positions bringing the locking shoulders into a locking position behind the nail heads 42, as shown in Figure 2.

Thus, the moulding is laterally passed onto the heads 42 and engages the heads with a snapping action. The leg portions, due to the inherent flexibility of the moulding, flex about the bight portion and are spread apart to receive the nail heads. Due to the cam means or surfaces 34 and 36, the snapping action is easily effected by a simple direct manual pressure on the moulding. Once the nail heads pass through the slot beyond the cam means, the leg portions automatically return to their normal positions and carry with them the locking shoulders 30 and 32 which grip behind the nail heads 42.

Thus, the leg portions are spread outwardly and carry the locking shoulders outwardly until the shoulders pass over the periphery of the nail heads, at which point they permit the leg portions to flex back to their normal positions.

When the locking shoulders 30 and 32 pass over and beyond the heads 42, the outer ends 44 and 46 of the leg portions are in contact with the surface of the pole and are held in such contact by the engagement of the locking shoulders with the underside of the nail heads 42. Such ends 44 and 46 define abutments or shoulders which are wedged against the surface of the pole and cooperate with the locking shoulders in securely fastening the moulding on the nail heads. The spacing of the abutments 44 and 46 and the locking shoulders 30 and 32 is, of course, dependent upon the spacing of the heads 40 and 42 of the nails.

A single headed nail 48, as shown in Figure 5, may be used but, in such instance, care must be exercised to space the nail head 50 the correct distance from the surface of the pole. In this respect, any type of fastener or anchoring means can be used, within the scope of this invention, which possesses an enlarged outer end over which the moulding may be snapped. It is preferred to use headed fasteners, like nails, since they can be easily driven into the pole by even an unskilled laborer.

In Figures 6–8, a modified form of moulding 16a is illustrated for attachment to the double headed nails 36a.

The moulding 16a includes leg portions 24a and 26a which are connected by the bight portion 22a and which are formed on their inner surfaces with the locking shoulders 30a and 32a. The outer end portions 52 and 54 of the leg portions are thickened or enlarged and are substantially triangular in cross-section to define the cam surfaces 34a and 36a and the lateral locking shoulders 30a and 32a on the inner converging ends of the cam surfaces.

Thus, instead of reverting the ends of the leg portions, as shown in Figure 7, the end portions of the leg portions may be thickened or enlarged to form the cam surfaces and the locking shoulders.

In the form of Figures 6–8, the inner surface of the bore 20a is formed with circumferentially spaced and axially extending spacing ribs 56 which grip the ground wire 12. In this embodiment, the bore communicates with the slot 28a, which is defined by the spaced, confronting cam surfaces 34a and 36a, through a throat 58 which is defined by confronting and spaced flanges 60 and 62. Such flanges form, on their innermost ends, a portion of the wall of the bore and have ribs 56 formed thereon. The ribs space the wire out of direct contact with the wall of the bore and create insulating air spaces entirely around the wire. The flanges 60 and 62 are interposed between the nail head 42a and the bore and space the wire 12 out of contact with the nail head.

Thus, in the form of Figure 7, the nail head is gripped by the locking shoulders 30a and 32a and the wire is gripped and held by the ribs 56 on the wall of the bore and by the ribs on the flanges. The wire is thus clamped in the moulding and prevented from moving laterally therein.

The moulding 16a is secured to the pole and mounts the wire thereon in the same way as the moulding 16 and the ends 44a and 46a are in contact with the surface of the pole when the locking shoulders 30a and 32a are gripped behind the nail head 42a.

In the form, shown in Figure 9, the moulding 16b of Figures 6–8, is adapted for use with a single headed nail 48a. In such form the moulding 16b has the locking shoulders 30b and 32b provided adjacent the outer ends of the leg portions 24b and 26b with the flanges 60a and 62a spaced inwardly therefrom. The flanges space the nail head 50a from the wire 12 and the ribs 56a are formed on the wall of the bore to grip the ground wire 12.

The outermost ends 64 and 66 of the inner surfaces of the leg portions 24b and 26b are slightly rounded to function as a cam means, such ends defining the slot 28b and being spread apart as the moulding 16b is pressed onto the nail head 50a.

The mouldings of the various illustrated forms are all capable of being snapped over the heads of the nails or over other suitable anchoring means and all are formed with internal locking means to grip and lock on a fastener that is secured to the pole or other support. Of course, the mouldings, having an internal locking means, may be secured to a suitable anchoring means by any manner of movement of the locking means onto the anchoring means, as by sliding the locking means over the heads of the nails or over other suitable anchoring means. It is also understood that any outdoor or indoor support is envisioned by this invention. Also, while a ground wire assembly is illustrated and described herein, any wire or cable may be attached to any support by the moulding and mounting arrangement of this invention.

Thus, other forms of or environments for the present invention may be realized, as fall within the scope of the appended claims and employ the features or equivalents thereof, as recited in such claims.

Having thus described this invention, what is claimed is:

1. As a new article of manufacture, an elongated channel shaped moulding of inherently flexible material within which a wire may be axially disposed, said moulding having opposing, spaced legs adapted to be spread apart to receive the wire and embracingly engage anchoring means on a support, and integral locking shoulders formed laterally on the inner surfaces of the legs inwardly of their outer ends to grip the anchoring means, and said inner surfaces of the legs intermediate the outer ends and said locking shoulders being outwardly divergent to define a cam means for laterally passing the legs over the anchoring means, and said inner surface of the moulding having integral ribs to grip the wire and space the wire from the anchoring means.

2. In an electrical transmission system including a conductor and a support, means for protectively mounting the conductor on the support and comprising an anchoring means adapted to be mounted on the support and having an anchoring portion spaced outwardly from the support, a moulding formed from inherently flexible material and being substantially channel-shaped in cross-section and within which the conductor is axially housed, said moulding having opposing leg portions adapted to be spread apart for the lateral passage of the moulding over the conductor, said leg portions having inner ends and outer free ends and having inner confronting sides, said sides being inclined inwardly from the outer ends toward the inner ends of the leg portions to provide cam surfaces for the lateral passage of the legs over the anchoring portion and locking shoulders formed laterally on the leg portions at the inner ends of the cam surfaces to grip behind the anchoring portion and lock the moulding on the anchoring means.

3. In an electrical transmission system including a conductor and a support, means for protectively mounting the conductor on the support and comprising an anchoring means adapted to be mounted on the support and having an anchoring portion spaced outwardly from the support, a moulding formed from inherently flexible material and being substantially channel-shaped in cross-section and within which the conductor is axially housed, said moulding having opposing leg portions adapted to be spread apart for the lateral passage of the moulding over the conductor, said leg portions having inner ends and outer free ends and having inner confronting sides, said sides being inclined inwardly from the outer ends toward the inner ends of the leg portions to provide cam surfaces for the lateral passage of the legs over the anchoring portion and locking shoulders formed laterally on the leg portions at the inner ends of the cam surfaces to grip behind the anchoring portion and lock the moulding on the anchoring means, and said outer ends of the leg portions defining abutments held in contact with the surface of the support by the engagement of the locking shoulders with the anchoring portion.

4. In a ground wire assembly which includes a line pole and a ground wire extending from adjacent the top of the pole to a ground rod that is anchored in the ground, means for protectively mounting the ground wire on the pole and comprising headed nails driven into the pole with their heads spaced outwardly from the surface of the pole, a moulding formed from inherently flexible material and being substantially channel-shaped in cross-section and within which the ground wire is axially housed, said moulding having opposing leg portions adapted to be spread apart for the lateral passage of the moulding over the ground wire, said leg portions having inner ends and outer free ends and having inner confronting sides, said sides being inclined inwardly from the outer ends toward the inner ends of the leg portions to provide cam surfaces for the lateral passage of the legs over the nail heads and locking shoulders formed laterally on the leg portions at the inner ends of the cam surfaces to grip behind the nail heads and lock the moulding on the nail heads, and said outer ends of the leg portions defining abutments held in contact with the surface of the pole by the engagement of the locking shoulders with the nail heads.

5. The combination with a conductor and a support, of means for protectively mounting said conductor on said support and comprising anchoring means mounted on said support and having an anchoring portion spaced outwardly from said support, a moulding formed of inherently flexible material and being substantially channel-shaped in cross-section and within which said conductor is axially housed, said moulding having a pair of inwardly directed opposed leg portions retaining said conductor housed within said moulding and engaging said anchoring portion of said anchoring means.

6. The combination with a conductor and a support, of means for protectively mounting said conductor on said support and comprising anchoring means mounted on said support and having an anchoring portion spaced outwardly from said support, a moulding formed of inherently flexible material and being substantially channel-shaped in cross-section and within which said conductor is axially housed, said moulding having a pair of inwardly directed opposed leg portions retaining said conductor housed within said moulding and engaging said anchoring portion of said anchoring means, said moulding having integral ribs on the inner surface thereof gripping said conductor and spacing said conductor from said anchoring portion.

7. The combination with a conductor and a support, of means for protectively mounting said conductor on said support and comprising a plurality of anchoring means arranged in spaced lineal relation along a surface of said support and having anchoring portions projecting from said support surface, and a moulding formed of inherently flexible material and being substantially channel-shaped in cross-section and within which said conductor is axially housed, said moulding having a pair of inwardly directed opposed leg portions retaining said conductor housed within said moulding and engaging said anchoring portions of said plurality of anchoring means.

References Cited in the file of this patent

UNITED STATES PATENTS

| 2,230,734 | Van Antwerp | Feb. 4, 1941 |
| 2,564,386 | Webb | Aug. 14, 1951 |

FOREIGN PATENTS

| 763,791 | Great Britain | Dec. 19, 1956 |